Patented Dec. 1, 1936

2,062,815

UNITED STATES PATENT OFFICE 2,062,815

GRAMOPHONE RECORD

Howard W. Matheson, Montreal, Quebec, Canada, assignor to Shawinigan Chemicals Limited, Montreal, Quebec, Canada No Drawing. Application August 25, 1932, Serial No. 630,476. Renewed June 6, 1936

4 Claims. (Cl. 106—22)

This invention relates broadly to moulded products and to a process of and compositions for producing said products and relates particularly to sound reproducing records and compositions of matter therefor and to the process of making the said compositions of matter and records composed thereof. An object of the invention is the production of permanently thermoplastic moulding compositions, and moulded products made therefrom. A further object is the production of sound reproducing records of great durability, strength and toughness. A still further object is the production of records which possess superior sound reproducing qualities.

The material generally used in the manufacture of sound-reproducing records is shellac mixed with certain fillers and other ingredients into a plastic mass which is then pressed into a matrix to produce the well known discs. Shellac has numerous disadvantages for this purpose, the principal of which are its non-uniformity, the varying amounts of wax and impurities contained in it, and its instability when heated. It is also lacking in strength, toughness and moisture resistance. Moreover, shellac cannot be used in a thin layer on a flexible backing, either alone or admixed with fillers, for sound reproduction. Alone it is not sufficiently hard and, when admixed with fillers, it lacks the flexibility and toughness requisite for the production of a flexible sound disc.

According to this invention, the compositions of matter and products moulded therefrom, including sound reproducing records, comprise essentially vinyl resins produced by reacting with a saturated or unsaturated aliphatic or aromatic aldehyde on a wholly or partially hydrolyzed vinyl ester polymer. These resins may be used alone or combined with fillers, pigments or plasticizers in proportions varying according to the desired nature of the composition and records. The softening points and other characteristics of the resins vary through wide ranges according to the methods employed in manufacture of the resins and it is a feature of this invention that the compositions and products made therefrom include two or more resins as aforesaid having different softening points and other different characteristics, the resins being admixed in proportions varying through a wide range according to the characteristics of the resins and the desired qualities of the product.

In greater detail the invention comprises the features and combinations of features hereinafter described and claimed.

The vinyl resins herein dealt with are, in general, hard, strong and tough and may be made with softening points varying through a wide range from considerably below to greatly above that of shellac, depending on the degree of polymerization and hydrolysis. Moreover, the characteristics of the resins may be predetermined by the method of their manufacture, so that uniformity of characteristics is assured.

Records made from these resins, either alone or admixed with fillers, pigments or plasticizers, have better sound reproducing characteristics than records made with shellac, are more durable and are not affected by moisture. The records may be of the usual rigid variety and will be stronger than those made with shellac. Alternatively, the records may be quite thin and flexible and formed either with or without a backing, such as paper. From a manufacturing point of view, the record compositions according to this invention are superior to the usual shellac compositions for a number of reasons, among which is the ability to reuse scrap as a result of the permanently thermoplastic character of the resins.

In order to facilitate understanding of the invention, the manufacture of various resins suitable for the purposes of this invention will be described, but it will be understood the invention is not confined to the proportions, temperatures, pressures, reagents, solvents and modes of treatment given and that considerable variations may be made in all these.

First resin

A convenient catalyst is prepared by continuously stirring for six to seven hours at room temperature a solution of acetic anhydride (8 molecules) in toluene (24 molecules) containing sodium perborate (4 molecules). At the end of this time the liquid content of the mixture is separated by filtration or decantation after sedimentation and contains the active catalyst which is estimated by determining the amount of iodine liberated by a given quantity and calculating as sodium perborate.

A mixture is prepared containing 70 parts of freshly distilled vinyl acetate (containing .25 parts acetaldehyde), 30 parts of toluene (including that added with the catalyst) and an amount of catalyst representing .3% sodium perborate calculated on the weight of vinyl acetate. This mixture is run into a suitable kettle, preferably glass-lined, fitted with an adequate agitator, and a vapour line discharging to a condenser refluxing through a U-seal to the kettle, and slowly heated. The mixture commences to reflux at about 72° C. and as polymerization proceeds the temperature in the kettle rises until it reaches 95° C., when the reaction is complete and the thick liquid is run into a still fitted for steam distillation and the toluene and unchanged vinyl acetate is removed in a current of steam. The white resinous mass of polymerized vinyl acetate may now be recovered and dried. A conversion of approximately 65% of the vinyl acetate is obtained. The viscosity of the product is 3.5 centipoises and is determined by measuring the outflow time of a 1 molar solution (8.6 grs. in 100 cc.) in benzene through an Ostwald viscosimeter at a constant temperature and then calculating the viscosity in absolute units from the known constant of the viscosimeter.

The polymer is now hydrolyzed and reacted with an aldehyde by any suitable method until approximately 50% of the acetyl groups are split off and the hydroxyl groups combined with aldehyde. The following method has been found satisfactory:—

100 parts of the polymer is dissolved in 65 parts of 90% butyl acetate (90% butyl acetate; 10% butyl alcohol) and 35 parts of butyl alcohol, and to this is added 6 parts of water, 26 parts of acetaldehyde and 2.7 parts concentrated sulphuric acid—all by weight. The material is now maintained at approximately 70° C. under a reflux condenser with continuous stirring for a period of approximately 5½ hours. Approximately 50% of the acetyl groups have been split off during this operation and the hydroxyl groups have entered into combination with the aldehyde. A large percentage of the acetic acid split off combines with the butyl alcohol and is recovered as butyl acetate. The free sulphuric acid is now neutralized by slowly running in an aqueous solution of caustic soda. The neutralized product is now run into a steam still and the solvents are all removed by steam distillation. The resulting wet resin is removed from the steam still to a suitable mixer and the soluble salts may be removed by washing with boiling water, the mixture being suitably heated. The material may then be dried and powdered. This resin is found to have a softening point of approximately 115° C.

Instead of simultaneous hydrolysis and combination with aldehyde, the hydrolysis may be effected first and the aldehyde reaction conducted in a separate subsequent step. In such case, the sulphuric acid of the first step may be used as catalyst in the second step or may be removed or neutralized by suitable means and replaced by any other suitable catalyst.

Second resin

A mixture is prepared consisting of 60 parts (by weight) of freshly distilled vinyl acetate, .2 parts acetaldehyde and 40 parts of benzol (including that added with the catalyst) and an amount of catalyst representing .2% sodium perborate calculated on the weight of the vinyl acetate. The catalyst is prepared in a similar way to that described in connection with the first resin, utilizing benzene instead of toluene. The mixture is heated in the same type of kettle as that previously outlined and is gently refluxed for a period of 4½ hours. During this time the thermometer immersed in the liquid rises from 72° to 75° C. At the end of this time the contents of the kettle are run into a steam still. The solvents and the unchanged vinyl acetate are removed in a current of steam, first under ordinary pressure and finally under 60 lbs. steam pressure. The solvents from this distillation and the unchanged vinyl acetate may be recovered and used over again. Approximately 65% of the vinyl acetate is converted to a polymer. The viscosity of the dried polymerized vinyl acetate is 15 centipoises, determined as in the previous example. A much higher degree of polymerization is obtained than in the previous example, and a higher melting and tougher product. This product is now hydrolyzed in presence of an aldehyde by a method similar to that used for production of the first resin, the only difference in the operation being that on account of the higher viscosity of the product a solution of lower concentration is used, for instance, 35 parts of polymer to 65 parts of a butyl acetate—butyl alcohol mixture of the same proportions as before. The proportions of water, acetaldehyde and sulphuric acid are approximately the same, i. e., 6; 26 and 2.7 respectively. Heating is continued at a temperature of approximately 73° C. for a period of .8 hours, and the finished product is recovered in a similar manner to that outlined in the previous example, and it is found that approximately 70% of the acetyl groups have been hydrolyzed and the free hydroxyl groups have combined with acetaldehyde. The softening point of the resin is found to be approximately 172° C. The resin is hard, strong, tough and horn-like, but being thermo-plastic it can be rolled and pressed readily if sufficiently high temperatures are used.

Third resin

.8 parts of sodium perborate and 1.8 parts of acetic anhydride are mixed with about 8 parts of commercial butyl acetate (containing 10% butyl alcohol). After shaking for a period of time the clear liquid is separated from the insoluble residue and added to 65 parts of vinyl acetate and 18 parts of commercial butyl acetate. This admixture contains .35% acetaldehyde on the total charge. Part of this mixture is then heated under reflux with agitation, preferably in an enamelled vessel and fitted with a side tube, through which the liquid polymerized material can be withdrawn, and the temperature is raised and maintained at approximately 87.5° to 88° C. and the remainder of the material continuously run into the heated kettle. At the same time the polymerized vinyl acetate in solution is continuously withdrawn at the same rate as the fresh mixture is added. Operating under these conditions in a continuous manner, polymerized vinyl acetate can be obtained which has a softening point of approximately 103° C. and a viscosity of 6 centipoises.

The polymerized vinyl acetate may be recovered in a similar manner to that outlined previously or the unchanged vinyl acetate may be removed by distillation and the polymerized vinyl acetate in solution may be made up to the proper proportions as previously outlined and submitted to the process of hydrolysis and combination with aldehyde.

As an illustration of the production of this resin, polymerized vinyl acetate having a viscosity of 6 centipoises is made up so that a concentration of 40% is obtained in the same proportions of butyl alcohol and butyl acetate as those outlined for manufacture of the first resin, and to this is added the same amounts of acetaldehyde, water and sulphuric acid as before.

The material is then subjected to heating as already described and for a period of 8 to 9 hours, when it is found that 70% of the acetyl groups have been split off and the free hydroxyl groups have combined with acetaldehyde. The resin formed may now be recovered as in the case of the second resin. A tough, strong resin is obtained, with a softening point of 152° C.

The resins just described have softening points between 115° C. and 172° C. and are made from polymers ranging in viscosity between 3.5 and 15 centipoises by hydrolyzing to the extent of from 50% to 70%, but similar resins of higher and lower softening points are satisfactory for the purposes of this invention, either alone or admixed with similar resins of lower or higher softening points respectively.

In general, vinyl resins having softening points between 95° C. and as much above 200° C. as is practicable for working and moulding are suitable. Such resins may be made from vinyl polymers having viscosity ranging all the way from 2 centipoises to 40 centipoises if hydrolyzed to suitable extent, say from 100% to 20% or even less. The hardness, toughness and softening point of the resins increase with increase in the percentage hydrolysis. Thus a suitable resin may be produced from a polymer of low viscosity, say 2 to 3.5 centipoises, if the same is hydrolyzed 90% to 100%. Conversely, a suitable resin may be produced by low percentage hydrolysis of a high viscosity resin.

According to this invention, moulded products, particularly sound reproducing records, and compositions of matter for moulding purposes, are composed of one or more resins of the character and within the range described, alone or admixed with fillers, pigments, plasticizers or other resins either natural or artificial. The fillers may be clay, such as that sold under the trade name "Melosil", or precipitated silica or other suitable material. For certain classes of products the fillers may be vegetable or mineral fibre or wood flour. The plasticizers may be carnauba wax, candelilla wax, Montan wax, di-butyl phthalate, stearates (either those of the metals or preferably the esters of aliphatic alcohols), or other suitable agents. The percentage of resin in the composition may vary from approximately 25% to approximately 100%, depending on the nature of the resin, the filler (if any) and the desired characteristics of the record or other moulded product.

The following examples are illustrative of the invention, but it will be understood the invention is not confined to the resins, fillers, pigments and plasticizers named nor to the proportions, temperatures and methods stated as all these may be varied within wide limits.

*Example I*

| | Parts |
|---|---|
| First resin | 25 |
| Clay | 63 |
| Bone black | 6 |
| Carbon black | 2½ |
| Carnauba wax | 3½ | are intimately mixed and worked on rolls heated to a temperature of approximately 250° F. for five or six minutes. The material is then formed into sheets and cut into pieces of proper dimension, so that each piece is sufficient to produce a record of desired size and usual thickness, say ⅛ inch. These pieces are then pressed between matrices heated to a temperature of approximately 250° F. in the manner well known in the art and yield rigid phonograph records.

The records thus produced are superior to records made in the usual way using shellac. Owing to the greater strength of the resin, no fibrous material such as cotton flock is or need be used and this omission of itself improves the sound reproducing qualities, which improvement is enhanced by the nature of the resin binder. The records made as above are more durable than those made with shellac, that is, their original sound reproduction characteristics do not deteriorate as rapidly as is the case with records containing shellac. Moreover, these records do not absorb moisture as readily as do shellac-containing records and are stronger, even with no fibrous content, than are records containing shellac and fibrous material. From a manufacturing viewpoint, the composition is superior to record compositions containing shellac in that the composition is permanently thermo-plastic and moulds readily besides permitting re-use of scrap.

*Example II*

| | Parts |
|---|---|
| Second resin | 7 |
| Third resin | 20 |
| Clay | 63 |
| Bone black | 6 |
| Carbon black | 2 |
| Carnauba wax | 2 | are mixed and treated as in Example I, except that the rolls and press are heated to approximately 350° F and the sheet material cut into smaller pieces so as to produce records only 25/1000" to 40/1000" thick.

The records thus made are flexible and extremely tough and strong, and possess sound reproducing qualities more enduring and much superior to records made using shellac.

The second resin and third resin may be mixed in various other proportions and higher percentages of resin may be used. If greater strength is desired, the percentage of the second resin may be increased, although higher temperatures are necessary on the mixing rolls and press. Either or both of the second resin and third resin may be admixed with the first resin.

*Example III*

Approximately half the clay filler of either of Examples I or II is replaced by additional amounts of the resins mentioned in these examples.

*Example IV*

All the clay filler of Example II is replaced by additional amounts of the resins mentioned, keeping the proportions of the resins approximately the same. Alternatively, a single resin of suitable softening point and toughness may be used instead of the resin mixture.

*Example V*

Five parts of a resin made by 70% hydrolysis of a vinyl ester polymer having a viscosity of 5 centipoises are mixed with one part of a resin made by 70% hydrolysis of a vinyl ester polymer having a viscosity of 15 centipoises.

Fifty-seven parts of the above mixture is admixed with thirty-three parts of clay and pigments and plasticizer as in Example II and worked and pressed at approximately 350° F.

A record $\tfrac{1}{16}$" to $\tfrac{3}{32}$" thick made of this mixture is quite flexible and has sound reproducing qualities and durability much greater than records made using shellac.

Example VI

From 25 to 75 parts of a resin produced by 95% hydrolysis of a vinyl ester polymer of 2.5 centipoises viscosity is mixed with 64 to 14 parts clay and pigments and plasticizer as in Example I. Up to 20% of the resin may be replaced by a tougher resin such as the second resin with advantage.

Example VII

From 25 to 75 parts of a resin produced by 30% hydrolysis of a vinyl ester polymer of 15 centipoises viscosity is mixed with other ingredients as in Example VI.

Example VIII

Resins such as the second resin or mixtures thereof, for instance as in Example II, are applied in a thin film to suitable backing such as hard paper, either by heat and pressure sufficient to spread the resin or by applying a solution of the resin, and impressed with sound reproducing grooves.

In any of the foregoing examples other pigments may be used or the pigments may be omitted altogether, also other plasticizers may be used and the amount may be varied. In general, resins of higher hydrolysis allows of use of more wax or other plasticizer. The amount of plasticizer used depends to some extent on the percentage and nature of the filler in the composition, higher percentages of filler indicating more plasticizer.

As will be seen from comparison of the three resins described, the softening point, toughness and quality of the resin increases (a) with the degree of polymerization of the vinyl acetate, and (b) with the extent to which, in each case, the acetyl groups are replaced by combination with an aldehyde.

In general, the resins made by high hydrolysis of low viscosity polymers tend to be harder and more brittle than resins made by lower hydrolysis of higher viscosity polymers which are tougher and tend to have higher softening points. Thus, a polymer with viscosity of 6 centipoises when 60% hydrolyzed produces a resin with softening point of approximately 143° C., while a polymer with viscosity of 15 centipoises when 30% hydrolyzed produces a resin with softening point of approximately 150° C. Because of these circumstances, considerable advantage results from mixing different resins so that each is modified by the other to produce combinations of hardness, toughness, flexibility and softening point which are not inherent to a single resin.

The advantages realized according to this invention are in general:—

(1) The compositions are permanently thermoplastic, thus greatly facilitating methods of operation and permitting utilization of scrap.

(2) Products may be obtained having strength, hardness, toughness and softening point varying through wide range.

(3) The products, especially when no vegetable fillers are used, are highly moisture resistant.

(4) The materials do not stick to moulds and very satisfactory surface formation and texture may be obtained.

(5) The products are highly resistant to wear.

In the case of sound reproducing records, additional advantages are:—

(6) The records produced are much stronger than records made using shellac; in the case of a record made using the mixed resins of Examples II and III the strength per unit of thickness is at least twice that of record made with shellac.

(7) No flocculent material, such as cotton flock, need be used to strengthen the record and, in this way, one avoids the known detrimental effect of fibrous materials on the qualities of sound reproduction and the susceptibility of fibrous materials to moisture.

(8) Inherently better sound reproducing quality due to the characteristics of the resin used and to the absence of impurities commonly found in shellac.

The invention is also susceptible of numerous variations. Sound reproducing records and other moulded products and the compositions from which they are formed may be made using resins produced from vinyl esters other than the acetic ester, for example, butyl and propyl esters.

While the only moulded articles herein mentioned are sound reproducing records, it will be understood numerous other useful and/or ornamental articles may be moulded from compositions within the ranges indicated.

Mixtures such as herein described may be moulded immediately on formation and while still hot as by the so-called injection moulding process, or may be cooled and later moulded by application of heat and pressure, consecutively in the order named or simultaneously. Products may be formed by moulding solid masses of the material or the cold material may be first reduced to powder form, introduced into moulds and heated and pressed in the moulds.

In the following claims, the expression "reacting a partially hydrolyzed vinyl ester polymer with an aldehyde" and other expressions of similar import are to be interpreted as including aldehyde reaction both simultaneously with and subsequent to hydrolysis.

Having thus described my invention, what I claim is:—

1. A gramophone record in which the recording surface comprises essentially a vinyl resin resulting from reacting an aldehyde with a partially hydrolyzed vinyl ester polymer.

2. A gramophone record in which the recording surface comprises a vinyl resin resulting from reacting an aldehyde with a partially hydrolyzed vinyl ester polymer and a plasticizer for said resin and a filler.

3. A gramophone record in which the recording surface comprises essentially a vinyl resin having a softening point above 90° C. and resulting from reacting an aldehyde with a vinyl ester polymer of 2 to 40 centipoises viscosity hydrolyzed to the extent that above approximately 20% and below 100% of the acetyl groups are split off and the hydroxyl groups reacted with the aldehyde.

4. A gramophone record in which the recording surface comprises essentially a vinyl resin derived from polyvinyl acetate of viscosity between 6 and 40 centipoises, in which at least 50% but below 100% of the acetyl groups of the polymer have been replaced by aldehyde.

HOWARD W. MATHESON.